Dec. 15, 1942. F. P. BROWN ET AL 2,304,880
MEANS FOR FILLETING FISH
Filed June 20, 1938 4 Sheets-Sheet 2

Inventors
*Fred Parsons Brown*
*Harry A. Gilbert*.
By *Cameron, Kerkam + Sutton*
Attorneys

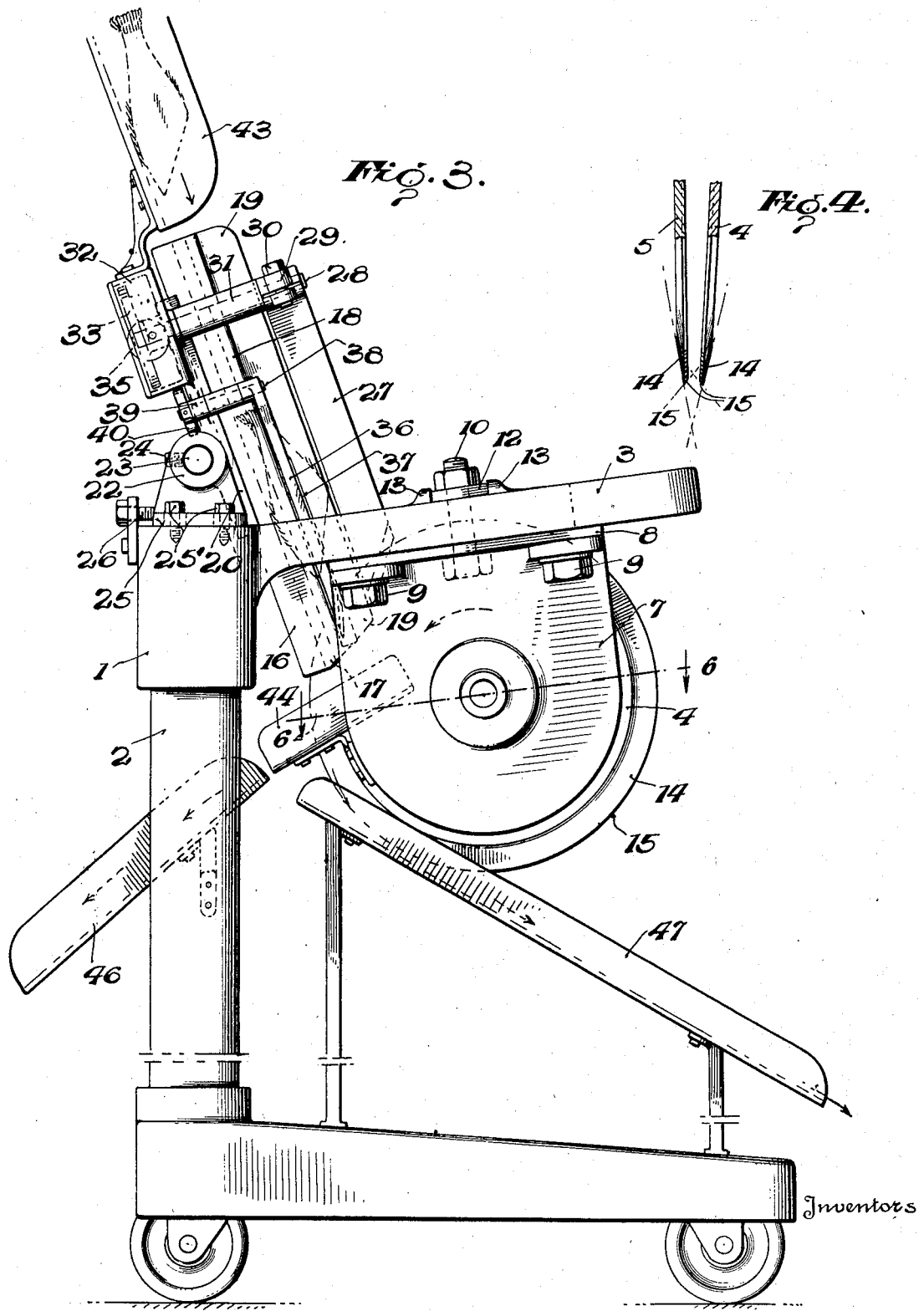

Dec. 15, 1942.  F. P. BROWN ET AL  2,304,880
MEANS FOR FILLETING FISH
Filed June 20, 1938  4 Sheets-Sheet 4

Inventors
*Fred Parsons Brown*
*Harry A. Gilbert*

By *Cameron, Kerkam & Sutton*
Attorneys

Patented Dec. 15, 1942

2,304,880

UNITED STATES PATENT OFFICE 2,304,880

MEANS FOR FILLETING FISH

Fred Parsons Brown, Braintree, and Harry A. Gilbert, East Milton, Mass., assignors to General Seafoods Corporation, Boston, Mass., a corporation of Massachusetts Application June 20, 1938, Serial No. 214,639½

15 Claims. (Cl. 17—3)

This invention relates to apparatus for filleting fish and more particularly to apparatus for automatically separating fillets of meat from the backbone and associated bony structure of the fish.

One of the objects of the invention is to provide novel means for rapidly and automatically cutting fillets away from the backbone of a fish fed thereto.

Another object is to provide novel means for filleting fish which is particularly adapted to cut through the fish close to the backbone so that waste is reduced to a minimum.

A further object is to provide fish filleting means embodying novel cutting devices constructed so as to minimize the danger of cutting through the bone and thus including pieces of bone in the fillets.

A further object is to eliminate all mechanical holding devices and mechanical feeding devices.

A further object is to present the fish to the moving cutting devices by gravity and without other moving parts so that the fish is substantially in a free state as it is acted upon by said devices.

A further object is to provide fish filleting apparatus embodying novel means for centering and guiding a fish as it is fed to and acted upon by the cutting devices to form fillets.

Other objects of the invention will appear hereinafter as the description proceeds.

One embodiment of the invention has been illustrated in the accompanying drawings, but it is to be expressly understood that said drawings are for purposes of illustration only, and are not to be taken as a definition of the limits of the invention, reference being had to the appended claims for this purpose.

In the drawings,

Fig. 3 is a side view of the apparatus shown in Fig. 1;

Fig. 4 is a detail showing part of the cutting devices;

Fig. 5 is a detail of a feeding chute;

Figure 1:
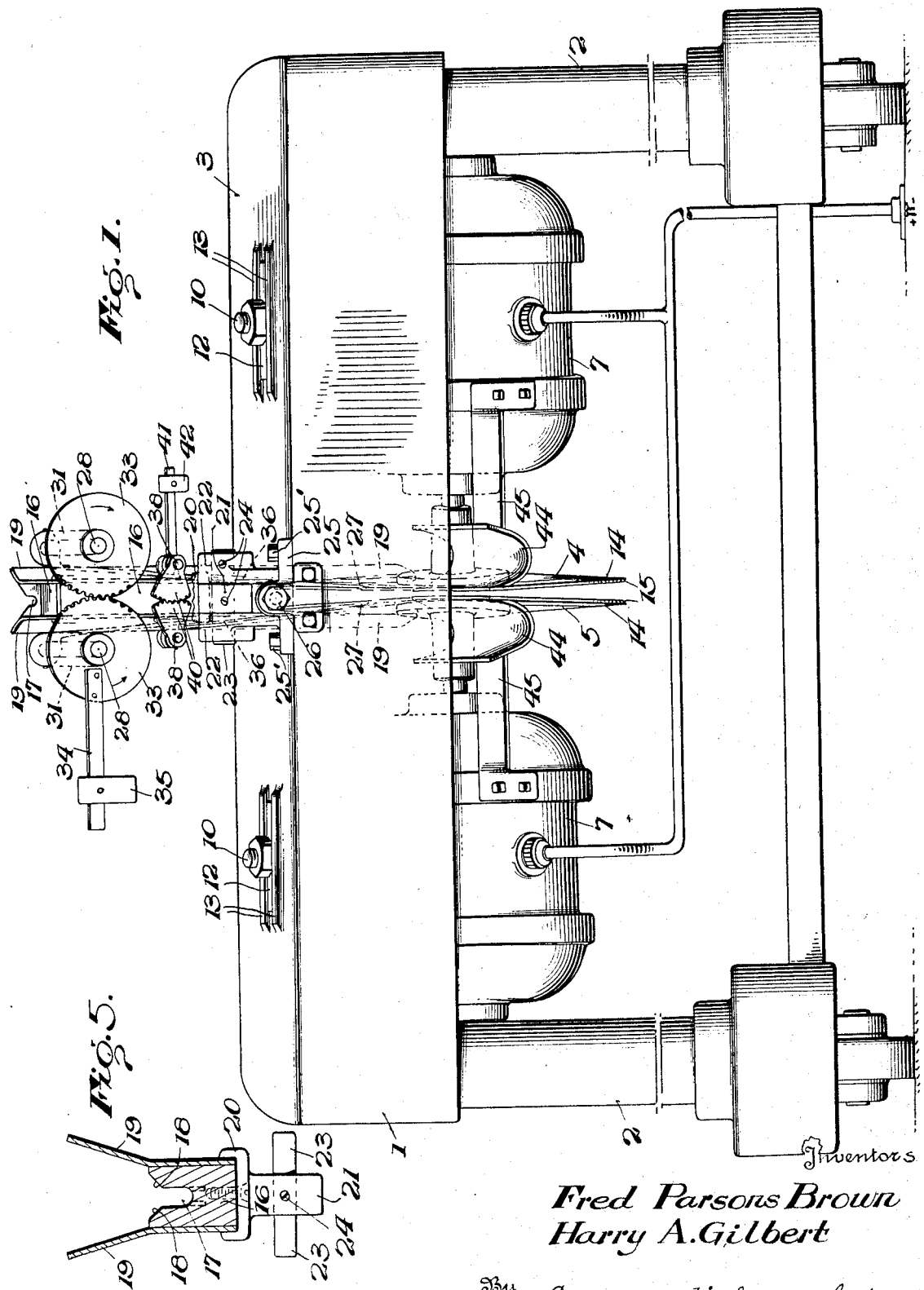
Fig. 1 is an elevation of an apparatus embodying the invention.
Figure 2:
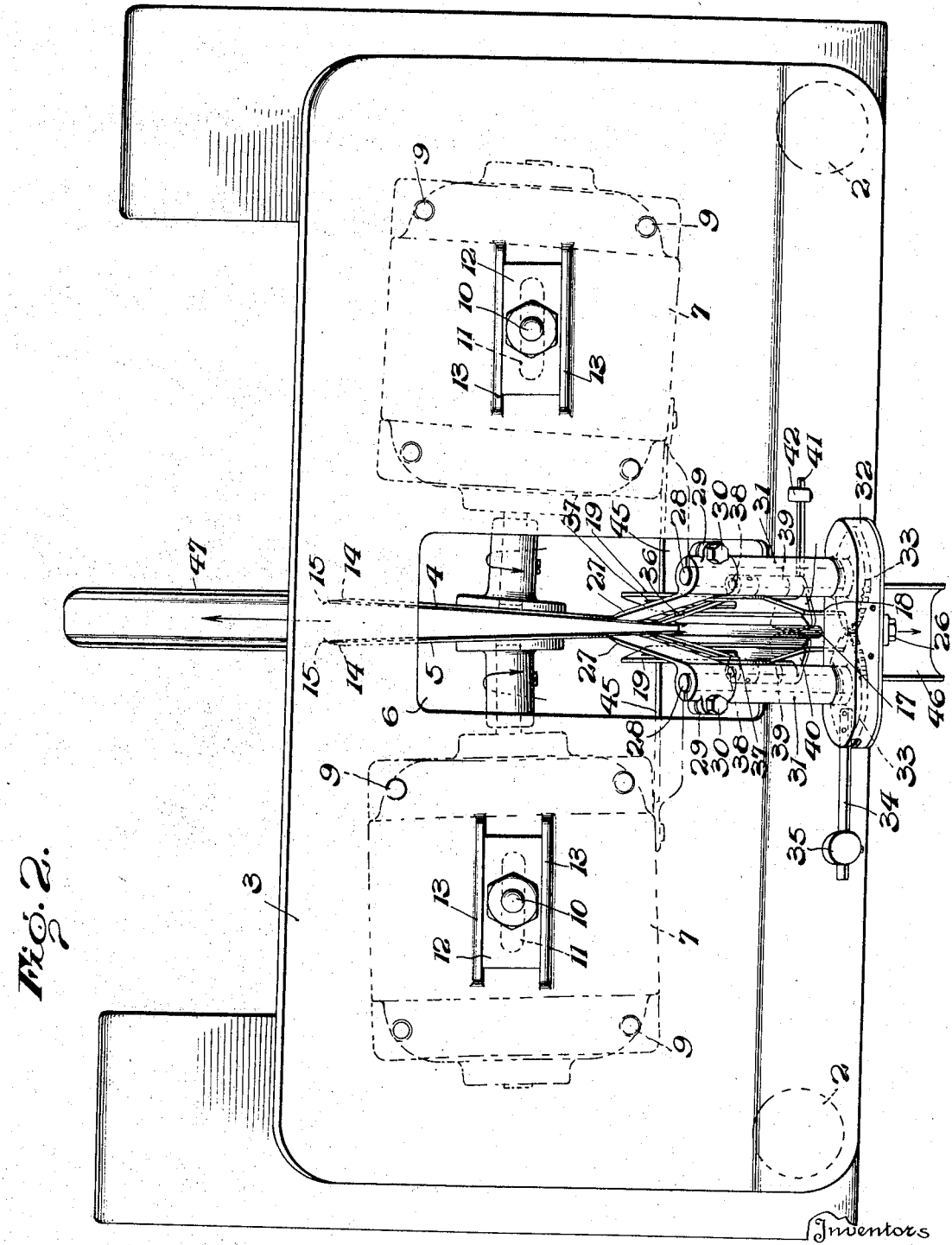
Fig. 2 is a plan view of the apparatus shown in Fig. 1.

Apparatus embodying the invention may be mounted in any suitable manner and in the form shown is carried by a suitable frame or table 1 having supporting legs 2 and a top 3. The cutting devices comprise rotating blades or knives adapted to enter a fish closely adjacent opposite sides of the backbone thereof and by cutting along the same to remove a fillet from each side thereof simultaneously. In the form shown, blades 4 and 5 are mounted beneath the table top 3, the latter being provided with an opening 6 above the blades through which the fish are fed downwardly as hereinafter described. Any suitable means may be provided for mounting and rotating the blades 4 and 5 but an adjustable mounting and positive drive are preferred. In the form shown the blades are driven by similar electric motors 7 each of which is secured to a bed plate 8 by means of bolts 9. The bed plates are suitably mounted on the table for angular adjustment, as by pivot bolts 10 passing through slots 11 in the table top and also through crossheads 12, said crossheads also being slidable between bosses or guides 13 on the table top to permit the motors to be moved toward and away from one another. The blade hubs are mounted on and driven by the extended armature shafts of the electric motors, and by loosening the bolts 10 and shifting the motors transversely or angularly, the spacing and angularity of the blades can thus be quickly varied to provide the proper cut on fish of different sizes.

The preferred construction and relation of the blades is shown in detail in Fig. 4, from which it will be seen that each blade is provided on its outer side with a relatively long bevel 14 and on its inner side with a relatively short bevel 15, the intersection of these beveled surfaces forming the cutting edges of the blades. By thus offsetting the cutting edges from the inner faces of the blades it is possible to set the blades so they will travel directly adjacent the backbone of the fish during operation and yet not cut or dig into the backbone itself. It has been found in practice that this construction substantially entirely avoids the tearing of the fish flesh and damage to the blades which occurs with single beveled blades as a result of cutting of the backbone, and insures a maximum yield of bone-free fillets.

Fish are fed by gravity and in succession to the rotating blades 4 and 5 by means which support the fish on one edge and center the body of the fish with the backbone entering between the blades. Fig. 5 shows in cross section a suitable form of guide chute which comprises a trough-like base 16 having a narrow longitudinally extending slot or groove 17 and flaring side walls 18 forming a trough to receive and guide a fish, and side plates 19 secured in any suitable manner to the base 16 and flaring outwardly above the base. This chute is suitably mounted in the opening 6 in the table top with the groove or trough in alignment with the rotating cutting blades 4 and 5. As shown, the base 16 is secured in any suitable manner to a plate 20 having a lug 21 which extends between brackets 22 and is rotatably mounted in said brackets by means of a pivot pin 23. The guide chute may be set in any suitable position by means such as set screws 24. The brackets 22 are formed integrally with a base 25 which is adjustably secured to the table by means of studs 25' passing through the slotted flanges of the base and an adjusting screw or bolt 26. By moving the base 25, the guide chute can be moved bodily toward or away from the cutting blades and at the same time the chute can be adjusted on its pivot 23. Preferably the chute is set as shown in the drawings in a position only slightly inclined to the vertical with its lower end within the circumference of the cutter blades 4 and 5. In this position the blades extend within the end of the guide chute and intersect the base 16, the lower end of the base being slotted to receive the blades as indicated by the dotted lines in Fig. 5.

While the lower edge of a fish is guided by the groove of the chute, it is desirable to provide means for guiding and centering the body of the fish above this groove, particularly when large fish are fed to the machine. For this purpose a pair of guiding arms 27 are mounted to swing above the side walls 19 of the chute and suitable means are provided so that the ends of these arms meet normally above the center of the chute and when separated by the passage of a fish therebetween are swung equal distances away from the center of the chute. In the form shown, each of the arms 27 is secured on one end of a rock shaft 28 in any suitable manner as by means of a clamp 29 and bolt 30. The shafts 28 are rotatably mounted in bearing sleeves 31 that are integral with or suitably secured to a casing 32 which in turn is integral with or suitably secured to plate 20 which supports the guide chute. Shafts 28 extend into the casing 32 and are provided on their inner ends with meshing gears or gear sectors 33. It will be seen that when the arms 27 have been centered over the feeding groove and the gears 33 engaged, said arms must always move equal distances from the center of said groove and therefore will support and guide the body of the fish and center it over said groove. The weight of the arms 27 themselves tends to maintain the lower ends of the arms in engagement over the center of the chute, but if desired they may be suitably biased to this position as by providing one or more of the gears 33 with an arm 34 and weight 35 to supplement the weight of the arms themselves.

In some cases it is desired to feed fish to the machine which are of the size indicated in Fig. 3 and which when placed in the chute do not extend above the side walls 19. In this event the arms 27 are ineffective to assist in guiding and centering the body of the fish and it is therefore desirable to provide additional guiding arms 36 which operate through slots 37 in the side walls 19. The construction and operation of the auxiliary guide arms 36 may be substantially similar to that of the guide arms 27. As shown, said arms 36 are secured to the ends of rock shafts 38 which are rotatably mounted in bearing sleeves 39 on the plate 20 which supports the chute. The lower ends of the shafts 38 carry gears or gear sectors 40, one or more of which may be provided with a laterally extending arm 41 and weight 42 similar to the arm 34 and weight 35 above described.

It has been found that for best results the relative arrangement of the guide chute and the cutting knives or blades is important. In the first place, the angle of the guide chute to the vertical must be regulated to provide proper feeding of the fish. If the chute is too nearly vertical, there is a tendency for the fish to tumble forward instead of sliding properly along the bottom of the chute. On the other hand, if the chute is too far from the vertical, the desired feed by gravity may be interfered with. It has been found that a chute angle to the vertical of about 17° is most desirable under usual conditions, although it will be understood that variations in angularity on either side of this 17° angle may be found suitable under particular conditions and may be used provided the variations are not so great as to interfere substantially with the accomplishment of the results stated above.

To insure complete cutting of the fillets, the bottom of the chute should not be tangent to the blades, but its lower end should be moved inwardly with the blades intersecting the base 16, as shown in Fig. 3. Moreover to facilitate feeding of the fish from the chute and through the cutting blades, the point at which the chute intersects the blades should preferably be somewhat above the horizontal so that the edges of the blades make a fairly sharp angle across the lower end of the chute. The fish is thus supported by the bottom of the chute as the blades cut through it, without pressing the whole length or a substantial part of the length of the fish against the bottom of the chute. At the same time, if the point of intersection is not too far above the horizontal, the direction of movement of the blades as they pass through the fish is principally downward, so that the pressure caused against the bottom of the chute is low and the downward movement of the blades tends to draw the fish from the chute. Fig. 3 illustrates a suitable relative disposition of the chute and blades, but it will be understood that variation of this relation is permissible within limits consistent with the attainment of the objectives of proper cutting and feeding of the fish.

Figures 6, 7:
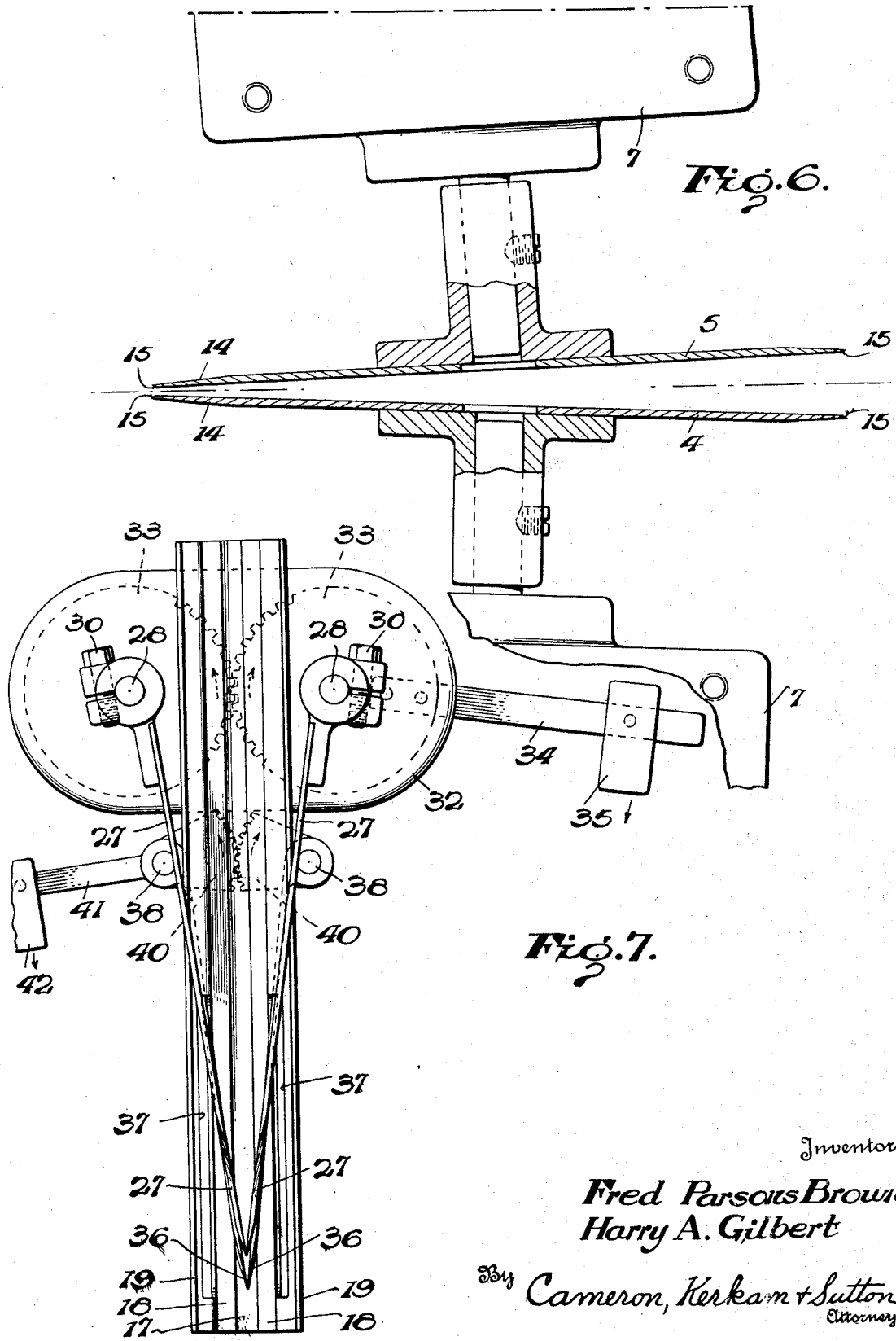
Fig. 6 is a section through the cutting blades on the line 6—6 of Fig. 3.
Fig. 7 is a view of the feed trough as seen from the right in Fig. 3.

Further as stated above the cutting blades can be so adjusted as to be set at an angle to each other, and a slight angularity of a few degrees is desirable to obtain better feeding of the backbone of the fish between the knives, as well as to obtain a greater yield as explained below. The cutting of the fillets from the backbone is accomplished at the periphery of the rotating blades, the backbone passing through between the blades to a suitable discharge. The action of the moving angularly disposed blades is to pass the backbone and associated bony structure rapidly away from the chute and to discharge it toward the other side of the blades. Moreover, it will be seen that the peripheries of the angularly disposed blades in effect form a V-shaped opening as shown in Figs. 4 and 6. When the projected line of the bottom of the chute is perpendicular or approximately perpendicular to that radius of the blades which passes through the point of closest approach of their peripheries, then the entering end of the backbone tends to pass through the V at a wider point than the tail end of the backbone, because the tail end of the backbone tends to be nearer to the bottom of the chute than the entering end. As a result the cut tends to be thicker at the entering end of the fish and thinner toward the tail end of the fish, thus conforming to the decreasing size of the backbone toward the tail and increasing the yield of fillets. This effect can be accentuated if desired by making the angle between the line of feed and the said radius of closest approach slightly less than 90°, which in effect moves the tail of the fish farther down into the narrow part of the V. Thus it has been found in practice that good results are obtained by locating the said radius at an angle of about 10° below the horizontal, in which case the angle between it and the line of feed (at about 17° to the vertical) is about 83°. This is accomplished in the form shown by tilting the table top 3 at an angle of 10°, but any other suitable mechanical expedient can be employed to this end. It will be understood, however, that the invention in its broad aspect is not limited to this particular relationship of the feed chute and knives.

The operation of the apparatus will be clear from the foregoing description. Fish are fed one by one to the chute, either from a suitable hopper 43 or by hand. It will be understood that the fish are preferably first scaled and their heads and napes are removed before being placed in the chute. As the fish slide down the chute one by one, they rest on one edge in the feeding trough and are centered by the arms 36 or 27 or both. In this manner the fish are delivered to the cutting blades with their backbones centered between the blades, so that each blade shears a fillet from one side of the backbone, the cutters at the same time acting to feed the fish downwardly and complete the cut rapidly. The slot 17 serves to guide the tail of the fish between the cutters, and the portion of the base 16 which projects between the cutters serves to support the center back fin of the fish as the fillets are cut away. The fillets which fall away on the outer sides of the rotating blades may be collected in any suitable manner as by means of the inclined troughs 44 supported by brackets 45 whereby the fillets are delivered into a discharge chute 46. These troughs 44 may if desired bear against and clean the cutter blades. The backbone of the fish passes out between the rotating blades and falls into a suitable receptacle such as the discharge trough 47.

With this apparatus the operation of cutting fillets from a fish is almost instantaneous so that the invention is particularly advantageous for filleting fish in large quantities on a commercial scale. At the same time the means described above for centering and guiding the fish as it is fed to the blades together with the provision of offset cutting edges on the blades makes it possible to adjust the blades so they just clear the backbone and provide a maximum yield of fillets. Were the fish not fed in proper alignment with the blades and were the cutting edges not offset, a much wider spacing of the blades would be necessary and more waste would result. The apparatus is simple, reliable and efficient and accomplishes the desired purpose in an automatic manner with no manual labor other than is involved in feeding fish to the machine.

While only one embodiment of the invention has been described and illustrated in the drawings, it will be understood that the invention is capable of a variety of mechanical expressions and that changes may be made in the form, details of construction and arrangement of parts without departing from the spirit of the invention. Reference is therefore to be had to the appended claims for a definition of the limits of the invention.

What is claimed is:

1. In apparatus for filleting fish, a rotating cutter adapted to cut a fillet away from the backbone of a fish and comprising a disk having a cutting edge at its periphery, the face of the disk away from the backbone having a relatively long bevel at its periphery and the face of the disk adjacent the backbone having a relatively short bevel at its periphery, the intersection of said beveled surfaces providing said cutting edge.

2. Apparatus for filleting fish comprising a pair of spaced cutting elements and means for feeding a fish thereto by gravity comprising an inclined guiding element aligned with said cutting elements and adapted to receive one edge of the fish, and means for supporting and centering the body of the fish as it moves along said guiding element comprising members normally engaging one another above the center of the guiding element and means operatively connecting said members for equal movement in opposite directions.

3. Apparatus for filleting fish comprising a pair of spaced cutting elements and means for feeding a fish thereto by gravity comprising an inclined guiding element aligned with said cutting elements and adapted to receive one edge of the fish, and a pair of swinging arms for supporting and centering the body of the fish above said guiding element, said arms normally meeting above the center of said guiding element and having operative connections whereby they swing in opposite directions and equal amounts.

4. Apparatus for filleting fish comprising a pair of spaced cutting elements and means for feeding a fish thereto by gravity comprising an inclined guiding element aligned with said cutting elements and adapted to receive one edge of the fish, and a pair of arms above said guiding element and normally meeting above the center thereof, said arms being geared to one another to move in opposite directions and equal amounts.

5. Apparatus for filleting fish comprising a pair of spaced cutting elements and means for feeding a fish thereto by gravity comprising an inclined guiding element aligned with said cutting elements and adapted to receive one edge of the body of the fish, a pair of arms above said guiding element and normally meeting above the center thereof, said arms being geared to one another to move in opposite directions and equal amounts, and means biasing said arms to their normal meeting position.

6. Apparatus for filleting fish comprising a pair of spaced cutting elements, an inclined guide trough aligned with said elements and adapted to receive one edge of the fish and guide and support the fish as it is fed to said element, and a pair of pivoted arms swinging above said trough and normally meeting above the center thereof, each of said arms having a gear connected for rotation therewith and said gears meshing with one another whereby said arms move in opposite directions through equal amounts.

7. Apparatus for filleting fish comprising a pair of spaced rotating cutters, an inclined feed trough for delivering a fish thereto and adapted to receive one edge of the fish, said trough having flaring side walls, a pair of swinging arms above said side walls and normally meeting above the center of said trough, and means operatively connecting said swinging arms for equal movement in opposite directions.

8. Apparatus for filleting fish comprising a pair of spaced rotating cutters, an inclined guide trough for feeding a fish thereto and adapted to receive one edge of the fish, slotted side walls extending above said trough, a pair of swinging arms mounted to swing through said slots and to meet normally above the center of said trough, and means operatively connecting said swinging arms for equal movement in opposite directions.

9. Apparatus for filleting fish comprising a pair of spaced rotating cutters, an inclined feed trough for delivering a fish to said cutters, said trough being adapted to receive one edge of the fish, slotted side walls extending above said trough, a pair of swinging arms above said side walls and normally meeting above the center of said trough, a pair of swinging arms mounted to swing through the slots of said side walls and to meet normally above the center of said trough, and means operatively connecting the swinging arms of each of said pairs for equal movement in opposite directions.

10. Apparatus for filleting fish comprising a pair of rotating cutting blades, each of said blades being beveled at its inner periphery to provide a cutting edge offset from its inner face, and means for feeding a fish by gravity to said cutting blades with its backbone substantially centered between the blades comprising an inclined guide trough adapted to receive one edge of the body of the fish, a pair of members normally meeting above the center of said trough and separable on passage of a fish therebetween, and means operatively connecting said members for equal movement in opposite directions.

11. Apparatus for filleting fish comprising a pair of rotating cutting blades, each of said blades being beveled on its inner periphery to provide a cutting edge offset from its inner face, and means for feeding a fish by gravity to said cutting blades with its backbone substantially centered between the blades comprising an inclined guide trough adapted to receive one edge of the body of the fish, a pair of swinging arms normally meeting above the center of said trough, and means operatively connecting said arms to swing in opposite directions in equal angles.

12. Apparatus for filleting fish comprising a pair of rotating cutting blades disposed angularly relative to one another with the blade radius through the point of closest approach of their peripheries disposed substantially horizontally, and means for feeding a fish on edge and by gravity to the blades at a point on their peripheries above the horizontal and adjacent said point of closest approach, said blades rotating in a direction to cut downwardly through the fish on both sides of the backbone thereof.

13. Apparatus for filleting fish comprising a pair of circular rotating cutting blades disposed angularly relative to one another with the point of closest approach of their peripheries disposed below the horizontal by an arc of the order of 10°, and an inclined gravity feed means for supporting and feeding a fish on edge to said blades with its backbone centered between the blades, said means being inclined to the vertical at an angle of the order of 17° and intersecting the peripheries of said blades above but adjacent to said point of closest approach.

14. Apparatus for filleting fish comprising a pair of rotating cutting blades, and means for feeding a fish thereto with its backbone centered between said blades, each of said blades having its inner periphery beveled at such an angle to the plane of the blade and to the vertical plane through the backbone of the fish as to provide a bevel surface adapted on contact with said backbone to deflect the cutting edge away from the backbone.

15. Apparatus for filleting fish comprising a pair of rotating cutting blades, and means for feeding a fish thereto with its backbone substantially centered between said blades, the inner and outer peripheral surfaces of each blade being beveled to provide a cutting edge and the angle between the inner bevel and the plane of the blade being large relative to the angle between the outer bevel and the plane of the blade.

FRED PARSONS BROWN.
HARRY A. GILBERT.